May 6, 1958 A. DI CAMILLO 2,832,987
SHRIMP DEVEINER AND SHELLER
Filed July 6, 1956
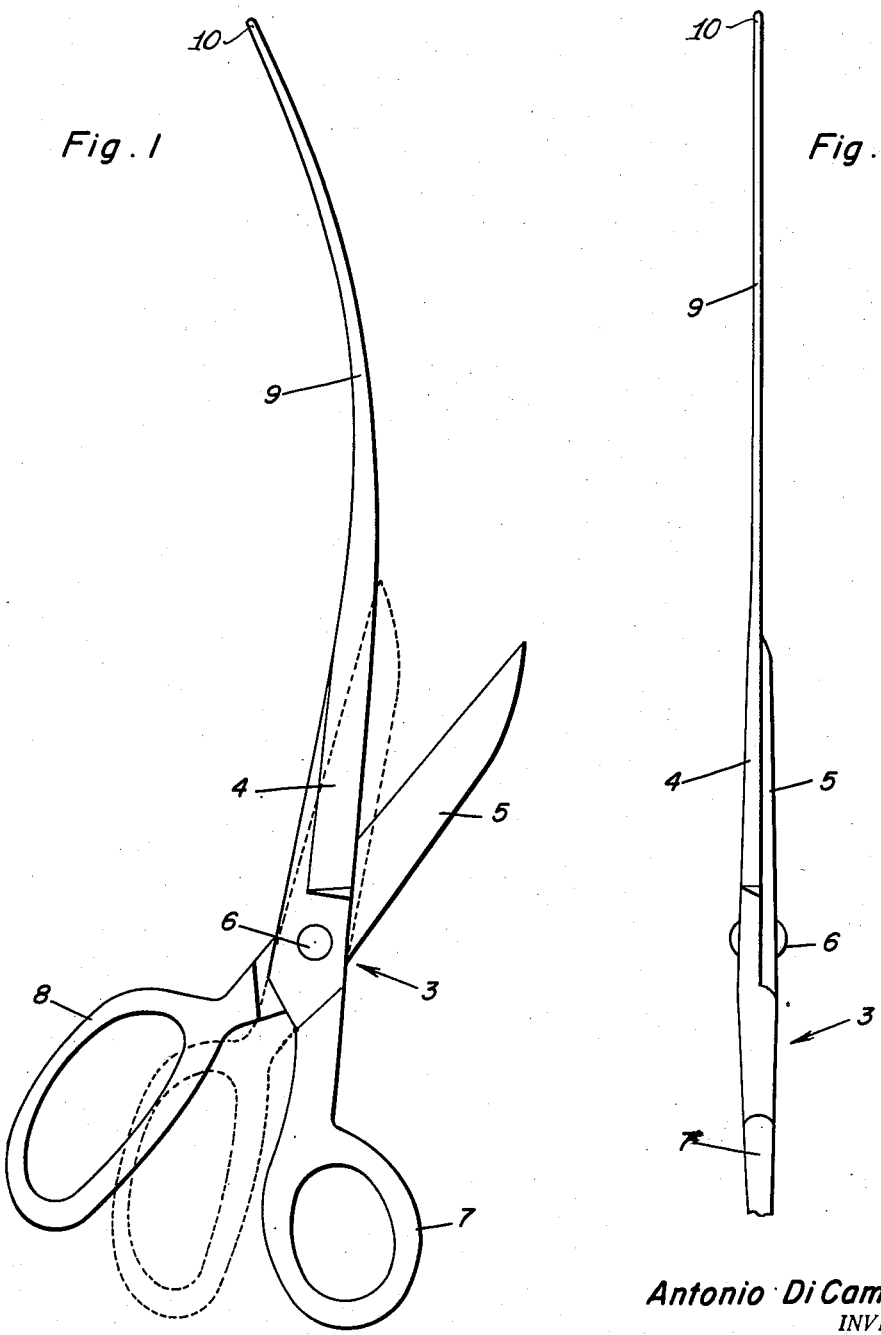
Antonio Di Camillo
INVENTOR.

United States Patent Office 2,832,987
Patented May 6, 1958

2,832,987

SHRIMP DEVEINER AND SHELLER

Antonio Di Camillo, Lyndhurst, N. J.

Application July 6, 1956, Serial No. 596,218

1 Claim. (Cl. 17—7)

The present invention relates to new and useful improvements in shrimp preparing instruments and has for its primary object to provide, in a manner as hereinafter set forth, a single device comprising a novel construction, combination and arrangement of parts whereby a shrimp may be expeditiously and without damaging the meat, deveined and shelled in one continuous operation.

Other objects of the invention are to provide a shrimp deveining and shelling device of the aforementioned character which will be relatively simple in construction, compact, of light weight, highly efficient and reliable in use and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a view in side elevation of a shrimp deveiner and sheller constructed in accordance with the present invention; and, Figure 2 is an elevation view taken at right angles to Figure 1 with a portion of the handles being broken away.

Referring now to the drawing in detail, it will be seen that the embodiment of the invention which has been illustrated comprises a pair of scissors which are designated generally by reference character 3. The scissors 3 include a pair of coacting blades 4 and 5 having one end portion thereof crossed and pivotally connected, as indicated at 6. The pivotally connected ends of the blades 4 and 5 are provided, respectively, with integral operating handles 7 and 8.

The blade 4 is tapered in width longitudinally and is of uniform thickness as shown and is formed integrally with the free end thereof is a rearwardly or outwardly curved deveining rod or finger 9. It will be noted that the blade 4 merges gradually with the deveining rod or finger 9, the longitudinal curvature of which approximates that of a shrimp. As shown in Figure 1, the finger 9 is of uniform cross-sectional dimensions from its outermost tip 10 to about its midportion, from which it is of a gradually increasing tapering thickness to where it merges into the blade 4.

It is thought that the use or operation of the instrument will be readily apparent from a consideration of the foregoing. Briefly, the longitudinally curved rod or finger 9 of the device is inserted in the vein vent of the shrimp and slight pressure is applied to said finger for removing said vein. With the thus deveined shrimp impaled on the tapered blade 4, the scissors 3 are closed. In this manner the shell of the shrimp is cut by the coacting blades 4 and 5 and said shell may be readily peeled from the undamaged meat. The shrimp is now ready for washing and cooking.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A shrimp cleaning tool for removing the sand veins and shells from shrimp comprising a pair of scissors having a pair of blades with cooperating smooth straight cutting edges, one of said blades at its end carrying and merging gradually into a rigid, curved smooth finger, said finger being of uniform thickness and tapering gradually in width along its length to a midportion thereof, the terminal portion of said finger being of uniform cross-sectional dimensions, said finger being curved away from the other blade to enable the finger to be inserted into a sand vein and passed therethrough to clean the vein and impale the shrimp and said scissors being operable to sever the back and shell of the shrimp while impaled for removal of the shell.

References Cited in the file of this patent

UNITED STATES PATENTS

| 159,598 | Megee | Feb. 9, 1875 |
| 369,205 | Parker | Aug. 30, 1887 |
| 973,296 | Peddle | Oct. 18, 1910 |
| 2,552,450 | Paoli | May 8, 1951 |
| 2,647,278 | Weinberger | Aug. 4, 1953 |